(12) United States Patent
Takeshita (10) Patent No.: US 8,568,110 B2
(45) Date of Patent: Oct. 29, 2013

(54) BLOWER FAN AND METHOD OF MANUFACTURING THE SAME

(75) Inventor: Hidenobu Takeshita, Kyoto (JP)

(73) Assignee: Nidec Corporation, Kyoto (JP)

( * ) Notice: Subject to any disclaimer, the term of this patent is extended or adjusted under 35 U.S.C. 154(b) by 285 days.

(21) Appl. No.: 13/165,829

(22) Filed: Jun. 22, 2011

(65) Prior Publication Data

US 2011/0318200 A1  Dec. 29, 2011

(30) Foreign Application Priority Data

Jun. 29, 2010 (JP) ................................. 2010-147142

(51) Int. Cl.
*F04B 35/04* (2006.01)

(52) U.S. Cl.
USPC .................... 417/353; 417/423.14; 417/423.7

(58) Field of Classification Search
USPC .................... 417/353, 423.7, 423.15, 423.12, 417/423.14, 424.1
See application file for complete search history.

(56) References Cited

U.S. PATENT DOCUMENTS

| 7,052,236 | B2 * | 5/2006 | Chang et al. ................... 415/191 |
| 7,726,006 | B2 * | 6/2010 | Teshima et al. ................... 29/596 |
| 8,113,793 | B2 * | 2/2012 | Yu et al. ......................... 417/354 |
| 8,303,274 | B2 * | 11/2012 | Winkler ....................... 417/423.7 |
| 2007/0065064 | A1 | 3/2007 | Kitamura et al. |
| 2009/0047148 | A1 * | 2/2009 | Chen et al. ....................... 417/354 |
| 2009/0180901 | A1 * | 7/2009 | Lee et al. ....................... 417/353 |
| 2011/0058963 | A1 * | 3/2011 | Horng ............................ 417/353 |
| 2012/0107156 | A1 * | 5/2012 | Takeshita et al. .............. 417/420 |

* cited by examiner

*Primary Examiner* — Devon Kramer
*Assistant Examiner* — Charles W Nichols
(74) *Attorney, Agent, or Firm* — Keating & Bennett, LLP (57) ABSTRACT

A blower fan includes a rotor arranged to rotate about a rotation axis together with a shaft, a stator arranged radially outward of the rotor and opposite the rotor, a motor support portion arranged to support the shaft through a bearing such that the shaft is rotatable, and an impeller arranged to rotate together with the shaft. The motor support portion includes a base portion, a bearing support portion arranged to support the bearing, and a stator support portion arranged to support the stator. Each of at least a portion of the bearing support portion which is in contact with the bearing and at least a portion of the stator support portion which is in contact with the stator is defined by a metallic member coupled to the base portion, which is made of a resin, preferably through, for example, insert molding.

11 Claims, 10 Drawing Sheets

BLOWER FAN AND METHOD OF MANUFACTURING THE SAME

BACKGROUND OF THE INVENTION

1. Field of the Invention

The present invention relates to a blower fan used, for example, to cool an electronic device, and a method of manufacturing such a blower fan.

2. Description of the Related Art

Outer-rotor motors, in which a rotor is arranged radially outward of a stator, have been predominantly used as motors for driving blower fans because they typically provide an easier assembling procedure, a reduced number of parts, and so on. In addition, in terms of performance, the outer-rotor motors typically have a greater moment of inertia and are able to achieve increased driving torque, and therefore are more easily able to maintain a constant rotational speed.

Meanwhile, as electronic devices have become increasingly dense in recent years the amount of heat generated by these increasingly dense electronic devices has also increased. As a result, there has been a demand for blower fans used to cool such electronic devices to rotate at a greater speed. The outer-rotor motors, however, may cause a problem in terms of strength, because an increased rotational speed of the blower fan leads to an increased vibration resulting from the great moment of inertia of the outer-rotor motors.

Blower fans using inner-rotor motors, in which the rotor is arranged inside of the stator, allow greater rotational speeds because the inner-rotor motors have a smaller moment of inertia than the outer-rotor motors.

U.S. 2009/0180901, for example, describes a blower fan using an inner-rotor motor. This blower fan includes a motor support portion in which a support portion (i.e., a bushing 233) arranged to support a bearing and a support portion (i.e., a position structure 232) arranged to support a stator are integral with each other.

The technique described in U.S. 2009/0180901, however, has problems because its motor support portion is made of a solid one-piece member defined by only a plastic or a metal.

That is, in the case where the motor support portion is made of a plastic or a metal, the support portion arranged to support the bearing is also made of the plastic or the metal, and it is therefore difficult to secure a sufficient vibration-resistant strength for an increased rotational speed of the blower fan.

Also, in the case where the support portion arranged to support the stator is made of a plastic or a metal, vibration that is generated in the stator may be transmitted to a housing through the plastic or the metal when the blower fan is caused to rotate at a great speed. Moreover, if the blower fan is caused to rotate at a great speed for a long time, the stator may generate too much heat to allow a sufficient heat radiation effect. It is therefore difficult to maintain reliability of the blower fan for a long time when the blower fan is caused to rotate at a great speed.

SUMMARY OF THE INVENTION

According to a preferred embodiment of the present invention, a blower fan including an inner-rotor motor is provided. In this blower fan, each of at least a portion of a bearing support portion which is in contact with a bearing and at least a portion of a stator support portion which is in contact with a stator is defined by a metallic member, and the two metallic members are coupled to a base portion made of a resin preferably through, for example, insert molding (double insert molding).

More specifically, a blower fan according to a preferred embodiment of the present invention includes a rotor arranged to rotate about a rotation axis together with a shaft; a stator arranged radially outward of the rotor and opposite the rotor; a motor support portion arranged to support the shaft through a bearing such that the shaft is rotatable; and an impeller arranged to rotate together with the shaft. The motor support portion preferably includes a base portion, a bearing support portion arranged to support the bearing, and a stator support portion arranged to support the stator. Each of at least a portion of the bearing support portion which is in contact with the bearing and at least a portion of the stator support portion which is in contact with the stator is defined by a metallic member coupled to the base portion, which is made of a resin, preferably through, for example, insert molding.

Because both the portion arranged to support the bearing and the portion arranged to support the stator are defined by the metallic members, a sufficient vibration-resistant strength of the bearing support portion is secured even when the blower fan is caused to rotate at a great speed, and heat that is generated from the stator is sufficiently radiated away even when the blower fan is caused to operate for a long time. Thus, it is possible to realize a blower fan that is able to maintain reliability for a long time even when the blower fan is caused to rotate at a great speed, and which is also able to satisfy the demand for reduced size and weight.

According to various preferred embodiments of the present invention, it is possible to realize a blower fan that is able to maintain reliability for a long time even when the blower fan is caused to rotate at a great speed, and which is able to cope with a demand for reduced size and weight.

DETAILED DESCRIPTION OF THE PREFERRED EMBODIMENTS

Hereinafter, preferred embodiments of the present invention will be described in detail with reference to the accompanying drawings. In the description of the preferred embodiments, a direction parallel or substantially parallel to a rotation axis and a radial direction centered on the rotation axis will be referred to simply as an "axial direction" and a "radial direction", respectively. Note that the present invention is not limited to the preferred embodiments described below. Also note that the preferred embodiments described below may be combined with other preferred embodiments of the present invention.

Figure 1:
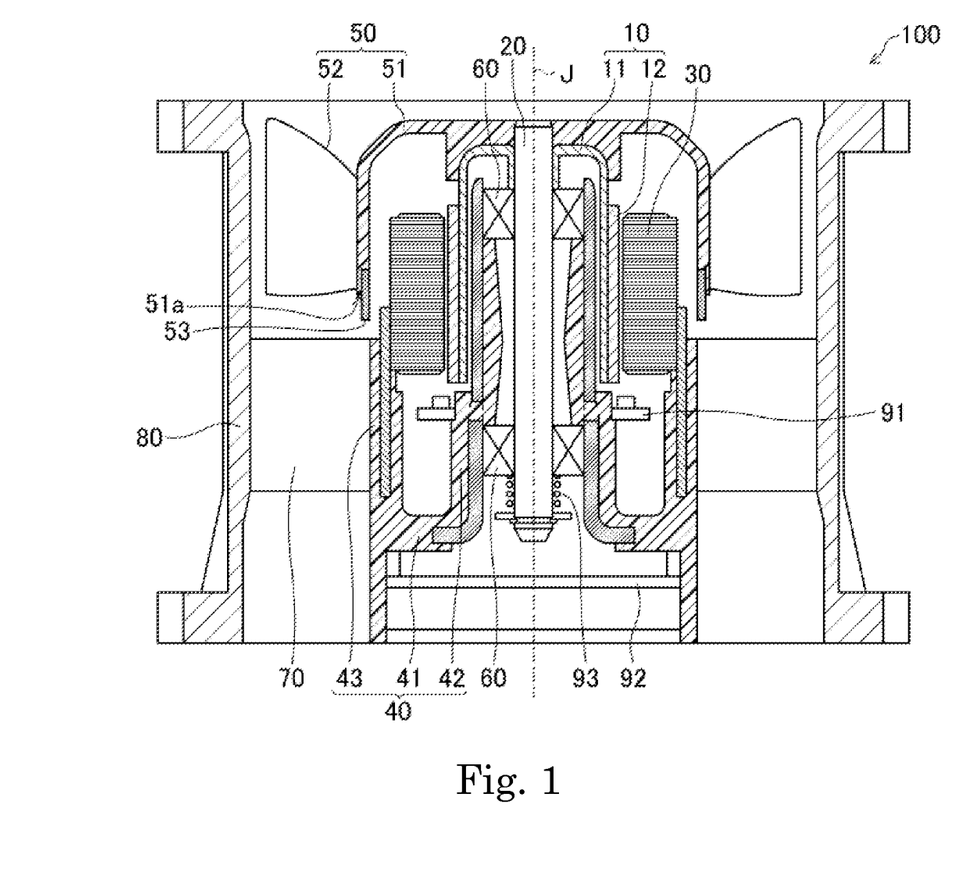
FIG. 1 is a schematic cross-sectional view illustrating a blower fan according to a preferred embodiment of the present invention.

FIG. 1 is a schematic cross-sectional view illustrating the structure of a blower fan 100 according to a preferred embodiment of the present invention. The blower fan 100 according to a preferred embodiment of the present invention is a so-called axial fan.

Referring to FIG. 1, the blower fan 100 includes a rotor 10 arranged to rotate about a rotation axis J together with a shaft 20, a stator 30 arranged radially outward of the rotor 10 and radially opposite the rotor 10, a motor support portion 40 arranged to support the shaft 20 through bearings 60 such that the shaft 20 is rotatable, and an impeller 50 arranged to rotate together with the shaft 20. The impeller 50 preferably includes a substantially cylindrical impeller cup 51 fixed to the shaft 20, and a plurality of blades 52 arranged on an outer circumferential surface of the impeller cup 51. The blades 52 are arranged to extend radially outward of the stator 30. The blower fan 100 is arranged to draw in air from one axial side and discharge the air to the other axial side through the rotation of the blades 52. In the following description, an inlet side and an outlet side along the axial direction will be referred to as an "upper side" and a "lower side", respectively, for the sake of convenience.

The rotor 10 preferably includes a substantially cylindrical rotor holder 11 fixed to the shaft 20, and a rotor magnet 12 fixed to an outer circumferential surface of the rotor holder 11. The rotor 10 is arranged to define a portion of an inner-rotor motor in which the stator 30 is arranged radially opposite the rotor magnet 12.

The motor support portion 40 includes a base portion 41, a bearing support portion 42 arranged to support the bearings 60, and a stator support portion 43 arranged to support the stator 30. The base portion 41, the bearing support portion 42, and the stator support portion 43 are preferably integral with one another so as to define a single monolithic element. While the base portion 41 is preferably arranged to join the bearing support portion 42 and the stator support portion 43 to each other, it is not necessary that a boundary between the base portion 41 and the bearing support portion 42 and a boundary between the base portion 41 and the stator support portion 43 should be definitely provided, as long as the motor support portion 40 as a whole includes the bearing support portion 42, which is arranged to support the bearings 60, and the stator support portion 43, which is arranged to support the stator 30. The base portion 41 preferably is not only arranged to support the motor but is also, for example, arranged to join the motor to a housing, arranged to support a circuit board, and so on. Therefore, the base portion 41 may have any of a desirable variety of shapes, sizes, and so on.

Figure 2:
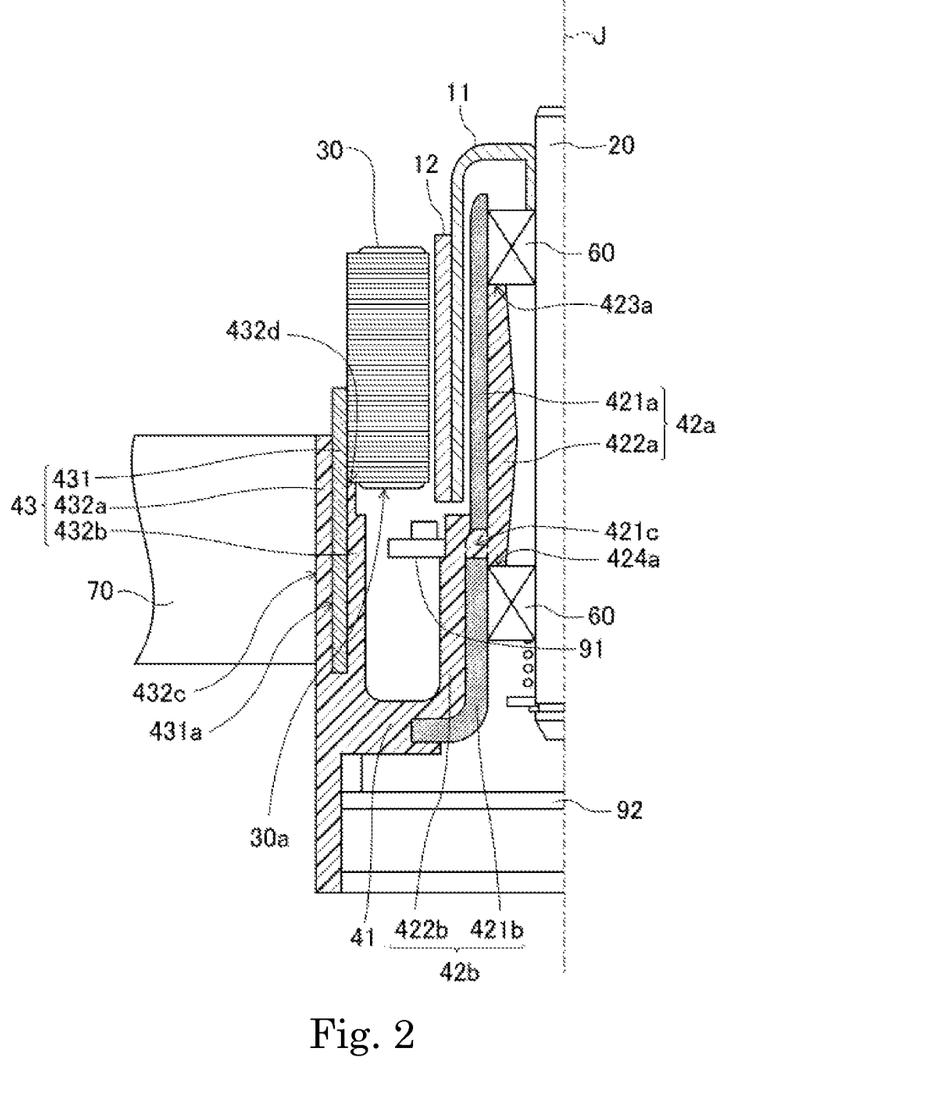
FIG. 2 is a partial cross-sectional view illustrating a motor support portion, bearings, a stator, and their surroundings in enlarged form as compared to FIG. 1.

Next, referring to FIG. 2, the structure of the motor support portion 40 will be described in more detail below. FIG. 2 is a partial cross-sectional view illustrating the motor support portion 40, the bearings 60, the stator 30, and their surroundings in enlarged form as compared to FIG. 1.

Referring to FIG. 2, the bearing support portion 42 preferably includes metallic members 421a and 421b arranged in contact with the bearings 60. The stator support portion 43 preferably includes a metallic member 431 arranged in contact with the stator 30. In the present preferred embodiment, the bearings 60 include a pair of ball bearings spaced from each other and arranged at upper and lower positions, respectively, in the axial direction. The metallic member 421a is arranged in contact with the bearing 60 arranged at the upper position in the axial direction, while the metallic member 421b is arranged in contact with the bearing 60 arranged at the lower position in the axial direction. In addition, each of the metallic members 421a, 421b, and 431 is coupled to the base portion 41, which is made of a resin, preferably through, for example, insert molding.

Note that, regarding the metallic members 421a and 421b, it is enough that the metallic members 421a and 421b should be defined in portions of the bearing support portion 42 which are at least in contact with the upper and lower bearings 60, respectively. Also note that, regarding the metallic member 431, it is enough that the metallic member 431 should be defined in a portion of the stator support portion 43 which is at least in contact with the stator 30. Therefore, a portion of the bearing support portion 42 and/or a portion of the stator support portion 43 may be made of a resin and defined integrally with the base portion 41. Needless to say, the entire bearing support portion 42 and/or the entire stator support portion 43 may be made of a metal, if so desired.

According to the above-described structure, the upper and lower bearings 60 are arranged to be held by the metallic members 421a and 421b, respectively, while the stator 30 is arranged to be held by the metallic member 431. Therefore, a sufficient vibration-resistant strength of the bearing support portion 42 is secured even when the blower fan 100 is caused to rotate at a great speed, and heat that is generated from the stator 30 is sufficiently radiated even when the blower fan 100 is caused to operate for a long time.

Moreover, regarding the motor support portion 40, the metallic members 421a and 421b provided in the bearing support portion 42 and the metallic member 431 provided in the stator support portion 43 are coupled to the base portion 41, which is preferably made of, for example, a resin, through double insert molding. Therefore, an improvement in the coaxiality between the bearings 60 and the stator 30 is achieved. Furthermore, the substantially cylindrical rotor holder 11 is fixed to the shaft 20, which is rotatably supported by the bearings 60, and the rotor magnet 12 is fixed to the outer circumferential surface of the rotor holder 11. Therefore, an improvement in the coaxiality between the rotor magnet 12 and the stator 30 is also achieved similarly. In addition, the metallic member 431 is provided in the stator support portion 43, and an outer circumferential surface of the stator 30 is arranged in contact with an inner circumferential surface of the metallic member 431. Therefore, an improvement in fixture strength of a core is achieved.

A specific structure of the motor support portion 40 according to the present preferred embodiment will now be described in more detail below with reference to FIG. 2.

Referring to FIG. 2, suppose for the sake of convenience that the bearing support portion 42 is divided into an upper portion 42a arranged to support the upper bearing 60, and a lower portion 42b arranged to support the lower bearing 60.

The upper portion 42a includes a resin layer 422a arranged radially inside the metallic member 421a, while the lower portion 42b includes a resin layer 422b arranged radially outside the metallic member 421b. Here, the upper metallic member 421a and the lower metallic member 421b are defined by a substantially cylindrical continuous body, and communicating holes 421c are defined at portions of a substantially cylindrical side wall thereof. The upper resin layer 422a and the lower resin layer 422b are joined to each other through portions of the resin that are embedded within the communicating holes 421c of the metal members.

An axially upper end portion 423a and an axially lower end portion 424a of the resin layer 422a in the upper portion 42a are thereby arranged in contact with a lower end portion of the upper bearing 60 and an upper end portion of the lower bearing 60, respectively, to achieve axial positioning of the bearings 60. Moreover, the resin layer 422b in the lower portion 42b is capable of supporting a first circuit board 91. Note that, in the case where a space defined between the bearing support portion 42 and the stator support portion 43 is small in width, it may be so arranged that a sensor arranged to detect magnetic flux of the rotor magnet 12 and so on are mounted on the first circuit board 91, while elements arranged to control a driving of the motor and so on are mounted on a second circuit board 92 which is supported by the base portion 41 in a wide space defined radially inside the base portion 41. Also note that the first circuit board 91 may be supported by the stator support portion 43 instead of by the bearing support portion 42.

Furthermore, referring to FIG. 2, the stator support portion 43 preferably includes a resin layer 432a arranged radially outside the metallic member 431, and a resin layer 432b arranged radially inside the metallic member 431. Furthermore, a portion of the metallic member 431 which is arranged in contact with the stator 30 is exposed without the resin layer 432a being arranged thereon.

The above-described structure makes it possible to mold a plurality of stationary vanes 70 integrally with the motor support portion 40 radially outside the resin layer 432a. The stationary vanes 70 are thereby able to achieve improved support strength.

Moreover, although a vibration generated in the stator 30 may be transmitted to the stationary vanes 70, the amplitude of the vibration transmitted to the stationary vanes 70 is reduced in the present preferred embodiment, because the metallic member 431 arranged in contact with the stator 30 is connected to the stationary vanes 70 through the resin layer 432a, which is made of a different material and which thereby acts to dampen vibrations generated in the stator 30.

Furthermore, the axial positioning of the stator 30 can be accomplished by arranging an axial lower end portion 30b of the stator 30 in contact with an upper end portion 432d of the resin layer 432b which is defined in a radially inner portion of the stator support portion 43. In addition, heat that is generated in the stator 30 is efficiently radiated to an outside when a portion of the metallic member 431 which is arranged in contact with, for example, a radially outer surface 30a of the stator 30 is exposed to, for example, air. Note that, when the exposed portion of the metallic member 431 is arranged outside of a portion 432c of the resin layer 432a on which the stationary vanes 70 are molded, the heat generated in the stator 30 is efficiently radiated while the support strength of the stationary vanes 70 is maintained. Note, however, that the exposed portion of the metallic member 431 is not limited to a particular position, and that a heat radiation effect is achieved as long as some portion of the metallic member 431 is exposed at least at a portion of a radially outer surface of the stator support portion 43.

As described above, regarding the blower fan 100 according to the present preferred embodiment, the motor support portion 40 includes the base portion 41, the bearing support portion 42 arranged to support the bearings 60, and the stator support portion 43 arranged to support the stator 30, and at least portions of the bearing support portion 42 which are in contact with the bearings 60 and a portion of the stator support portion 43 which is in contact with the stator 30 are defined by the metallic members 421a, 421b, and 431, respectively, which are coupled to the base portion 41. Therefore, a sufficient vibration-resistant strength of the bearing support portion 42 is secured even when the blower fan 100 is caused to rotate at a great speed, and the heat that is generated from the stator 30 is sufficiently radiated even when the blower fan 100 is caused to operate for a long time. Moreover, because the metallic members 421a, 421b, and 431 are coupled to the base portion 41, which is preferably made of, for example, a resin, through the double insert molding, a reduction in the weight of the entire motor support portion 40 is achieved, and improvements in the coaxiality of the bearings 60 and the stator 30 and in the coaxiality of the rotor magnet 12 and the stator 30 are achieved. Thus, it is possible to realize a blower fan that is able to maintain reliability for a long time even when the blower fan is caused to rotate at a great speed, and which is able to cope with a demand for reduced size and weight.

Here, in the case of a blower fan in which an outer-rotor motor is used, it is possible to fix a rotor magnet to an inner circumferential surface of a rotor holder fixed to a shaft, and at the same time to press fit an impeller cup to an outer circumferential surface of the rotor holder and thereby fix the impeller cup to the rotor holder. The impeller cup is therefore able to maintain its strength due to the rotor holder.

In contrast, in the case of a blower fan in which an inner-rotor motor is used, the rotor magnet 12 is fixed to the outer circumferential surface of the rotor holder 11 as illustrated in FIG. 1, and it is therefore impossible to press fit the impeller cup 51 to the outer circumferential surface of the rotor holder. Therefore, the strength of the impeller cup 51 of the blower fan in which the inner-rotor motor is used cannot be as great as that of the impeller cup of the blower fan in which the outer-rotor motor is used.

Referring to FIG. 1, it is therefore preferable to arrange an annular metallic member 53 in a lower opening end portion 51a of the impeller cup 51 in order to increase the strength of the impeller cup 51. In that case, the annular metallic member 53 may be coupled to the impeller cup 51 through, for example, insert molding. In this case, the annular metallic member 53 will be positioned with an excellent balance.

In FIG. 1, the metallic member 53, which is provided in the impeller cup 51, and the metallic member 431, which is provided in the stator support portion 43, are preferably arranged to overlap with each other in the radial direction. Note, however, that the metallic member 53, which is provided in the impeller cup 51, and the metallic member 431, which is provided in the stator support portion 43, may be arranged to have substantially the same outside diameter without overlapping with each other, if so desired. Also note that the rotor holder 11, as well as the annular metallic member 53, may be coupled to the impeller cup 51 through, for example, insert molding.

Figure 3:
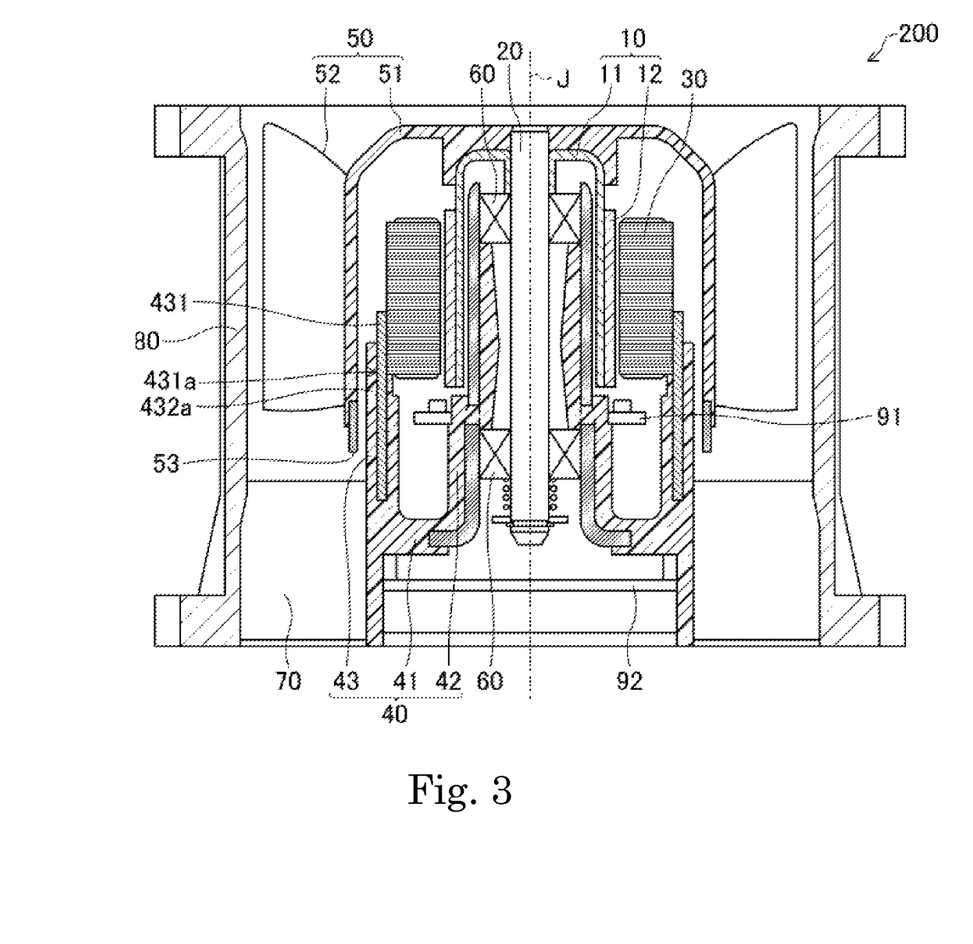
FIG. 3 is a schematic cross-sectional view illustrating a blower fan according to an example modification of a preferred embodiment of the present invention.

FIG. 3 is a schematic cross-sectional view of a blower fan 200 according to an example modification of the above-described preferred embodiment, i.e., an example modification of the blower fan 100 according to a preferred embodiment of the present invention. The blower fan 200 is similar in structure to the blower fan 100 illustrated in FIG. 1 except in the positions where the stationary vanes 70 are arranged.

Referring to FIG. 3, the stationary vanes 70 preferably are molded integrally with the motor support portion 40, and arranged not on the resin layer 432a, which is arranged on a radially outer surface 431a of the metallic member 431 in the stator support portion 43, but at a level lower than that of the resin layer 432a. Note that, in FIG. 3, the stationary vanes 70 are molded integrally with the motor support portion 40 to define a monolithic one-piece element, and arranged at a level corresponding to that of the base portion 41. The stationary vanes 70 may be molded integrally with the motor support portion 40, and arranged at a level lower than that of the stator support portion 43.

When the stationary vanes 70 are arranged as described above, the blades 52 arranged on the impeller cup 51 and the stationary vanes 70 molded integrally with the motor support portion 40 are arranged such that an excellent balance in an entire air channel within a housing 80 is present. In this case, because the impeller cup 51 and the resin layer 432a provided in the stator support portion 43 are arranged to overlap with each other in the radial direction, the radial dimension of each of the blades 52 arranged on the impeller cup 51 is reduced. Note, however, that the air volume of the blower fan 200 is affected to only a limited degree because the axial dimension of each of the blades 52 arranged on the impeller cup 51 can be increased because of the lowered level of each of the stationary vanes 70.

Figure 4:
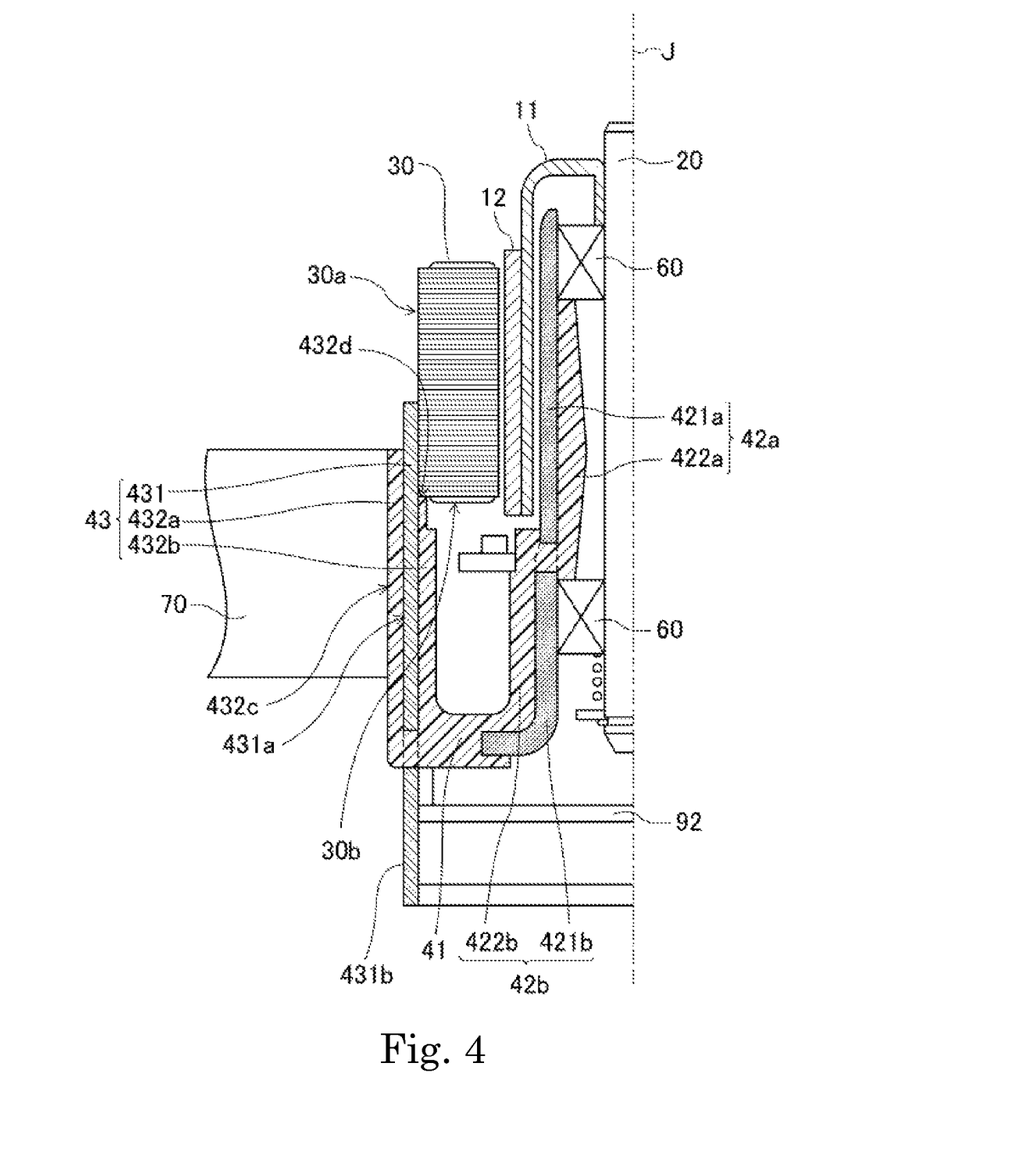
FIG. 4 is a schematic partial cross-sectional view illustrating a motor support portion according to an example modification of a preferred embodiment of the present invention.
Figure 5:
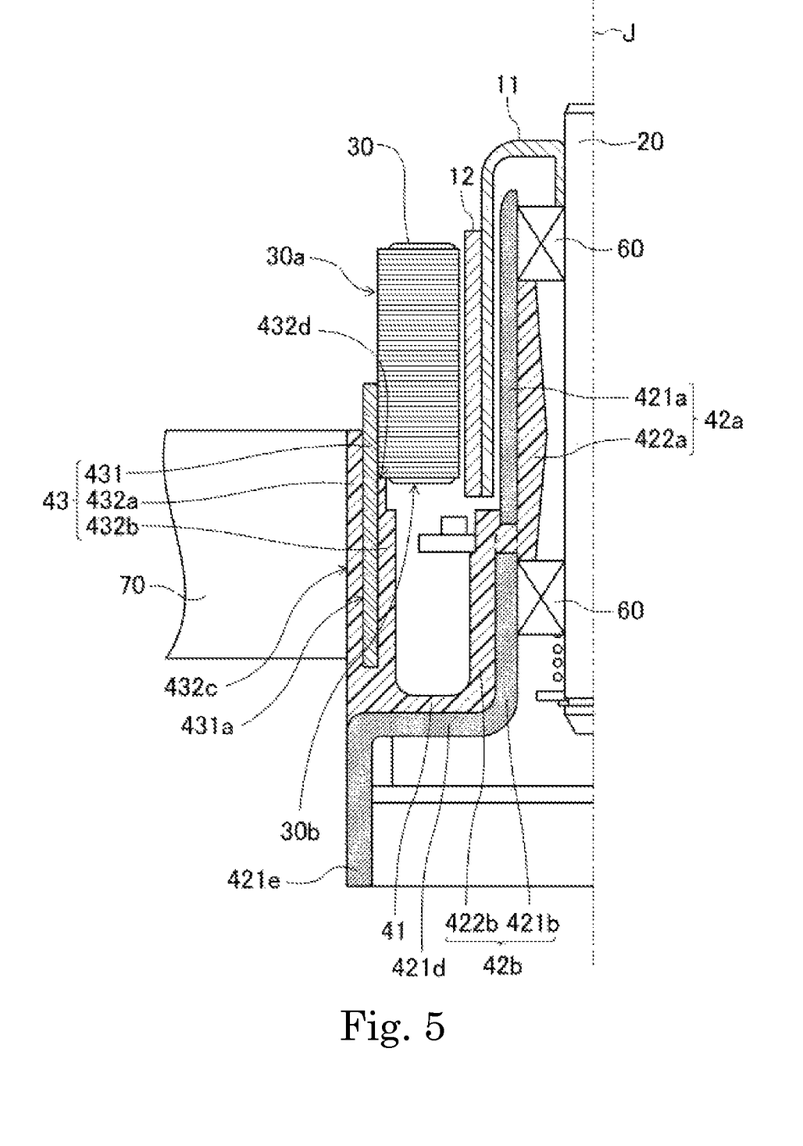
FIG. 5 is a schematic partial cross-sectional view illustrating a motor support portion according to another example modification of a preferred embodiment of the present invention.
Figure 6:
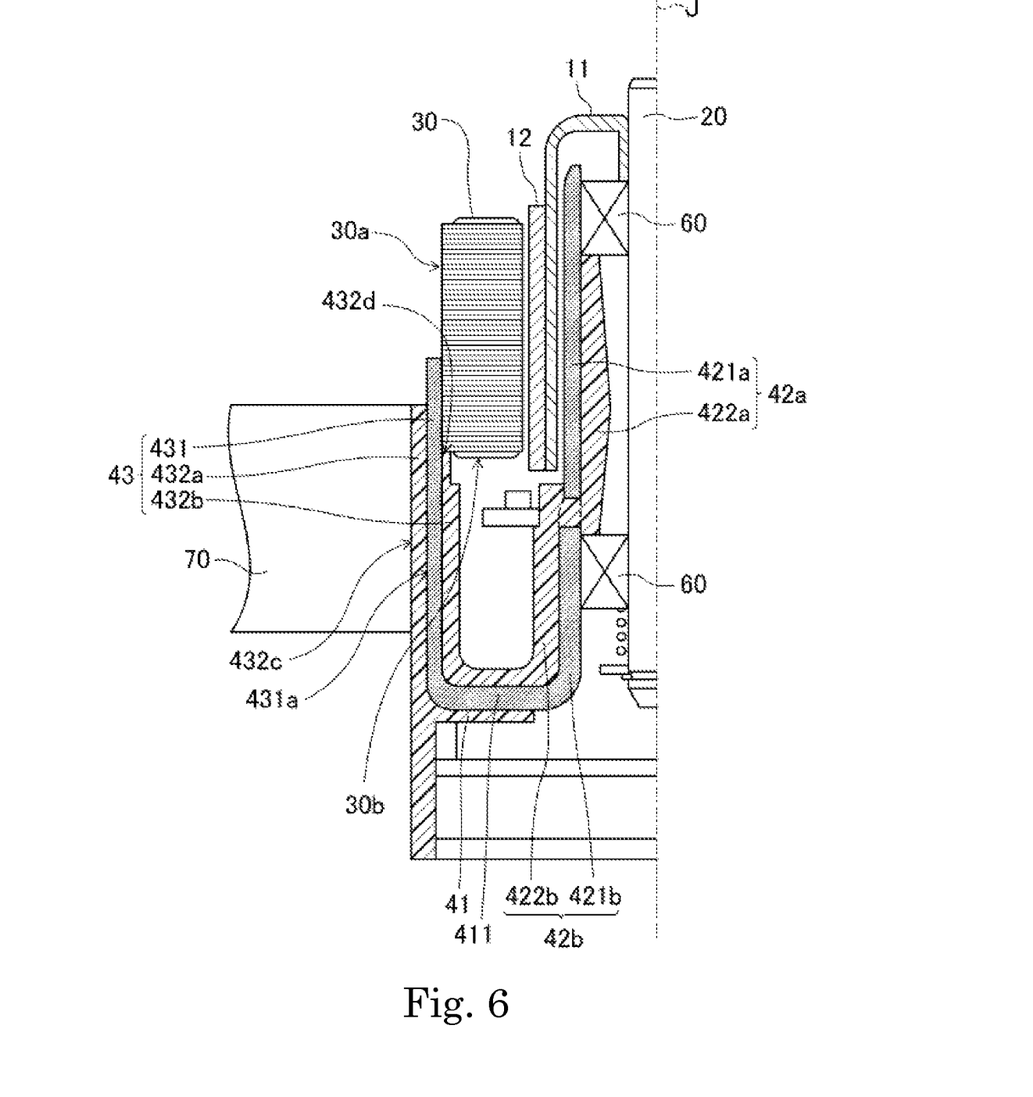
FIG. 6 is a schematic partial cross-sectional view illustrating a motor support portion according to yet another example modification of a preferred embodiment of the present invention.

FIGS. 4, 5, and 6 are each a partial cross-sectional view schematically illustrating an example modification of the motor support portion 40 according to a preferred embodiment of the present invention. A blower fan according to each of these example modifications is similar in structure to the blower fan 100 illustrated in FIG. 1 except in the motor support portion 40.

In the motor support portion 40 illustrated in FIG. 4, a lower end portion of the metallic member 431 provided in the stator support portion 43 is arranged to extend into the base portion 41, and, moreover, a portion thereof (hereinafter referred to as an exposed portion 431b) is arranged to be exposed below the base portion 41. Heat generated in the stator 30 is thereby radiated efficiently through the exposed portion 431b, which is made of a metal. Note that, in this case, the second circuit board 92 may be supported by the exposed portion 431b of the metallic member 431 instead of by the base portion 41.

In the motor support portion 40 illustrated in FIG. 5, an end portion of the metallic member 421b provided in the bearing support portion 42 is arranged to extend into the base portion 41, and, moreover, a portion thereof (hereinafter referred to as an exposed portion 421d) is arranged to be exposed below a lower end portion of the base portion 41. Heat generated in the bearings 60 is thereby radiated efficiently through the exposed portion 421d, which is made of a metal. Moreover, heat radiation efficiency is further increased when an end portion of the exposed portion 421d of the metallic member 421b is arranged to extend up to the air channel arranged radially outward. Furthermore, as illustrated in FIG. 5, the end portion of the exposed portion 421d of the metallic member 421b may be further arranged to bend axially downward to define an extension portion 421e extending downward, and the second circuit board 92 may be supported by the extension portion 421e.

In the motor support portion 40 illustrated in FIG. 6, the metallic member 421b, which is provided in the bearing support portion 42, and the metallic member 431, which is provided in the stator support portion 43, are joined to each other through a metallic member 411 provided in the base portion 41. This makes it possible to mold the metallic members 421a and 421b, which are provided in the bearing support portion 42, and the metallic member 431, which is provided in the stator support portion 43, integrally with one another to thereby define a monolithic one-piece member. This contributes to improving the coaxiality between the bearings 60 and the stator 30 and, moreover, to improving the coaxiality between the rotor magnet 12 and the stator 30.

Next, a method of manufacturing the blower fan 100 according to the present preferred embodiment illustrated in FIG. 1 will now be described below.

Figure 7:
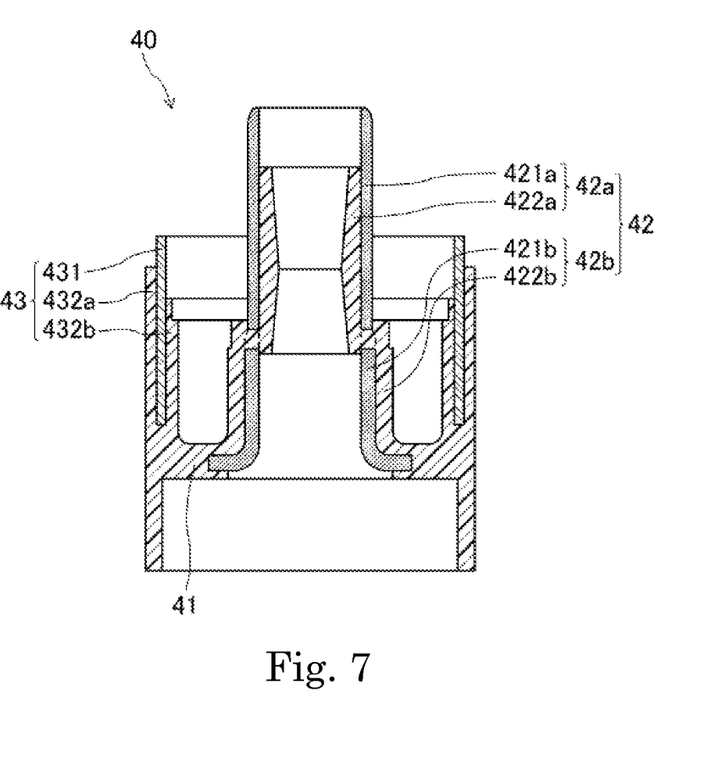
FIG. 7 is a schematic cross-sectional view illustrating the structure of the motor support portion molded in one piece according to a preferred embodiment of the present invention.

Referring to FIG. 7, first, the motor support portion 40 including the base portion 41, the bearing support portion 42 arranged to support the bearings 60, and the stator support portion 43 arranged to support the stator 30 preferably is molded to define a one-piece monolithic member. At this time, the metallic members 421a, 421b, and 431 are coupled to the base portion 41 preferably through insert molding such that the metallic members 421a and 421b are arranged in at least portions of the bearing support portion 42 which are to be in contact with the bearings 60, respectively, and that the metallic member 431 is arranged in at least a portion of the stator support portion 43 which is to be in contact with the stator 30.

Here, the motor support portion 40 can be defined by a method as described below.

Figure 8:
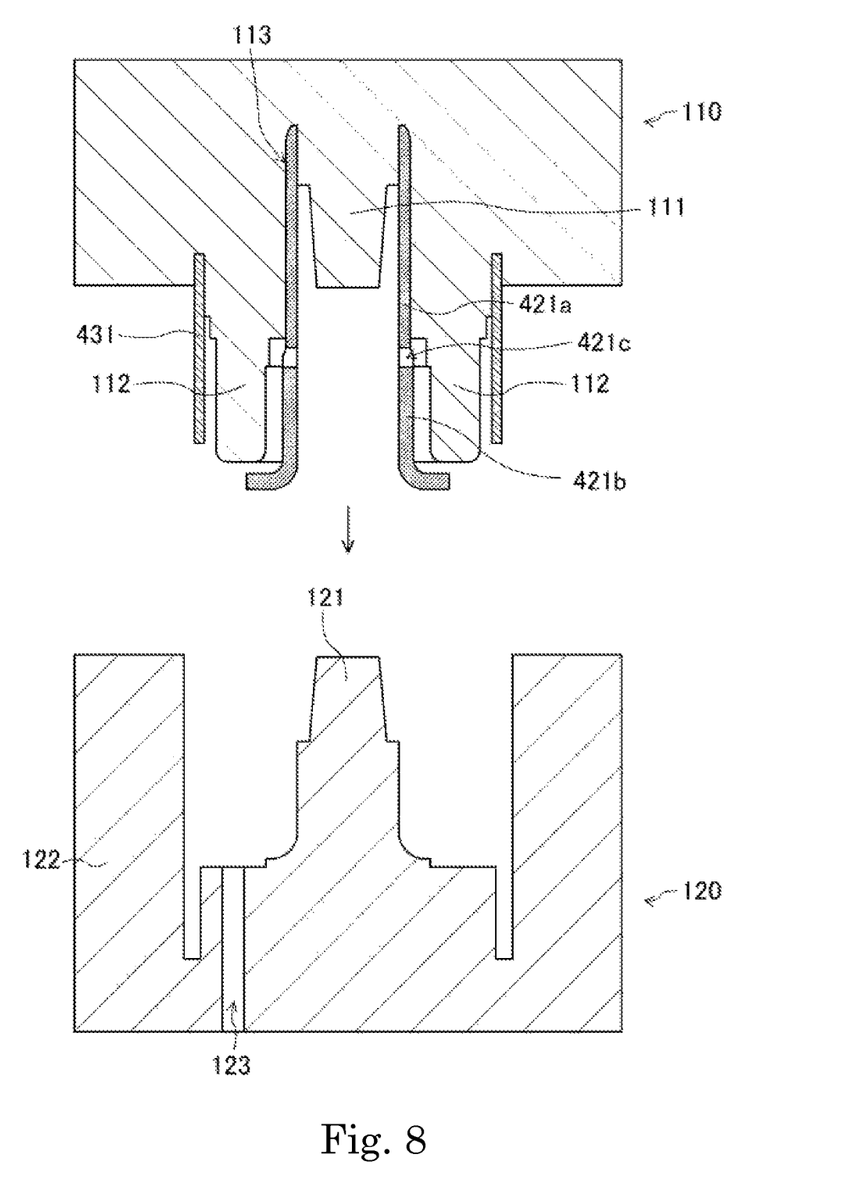
FIG. 8 is a cross-sectional view illustrating the structures of molds used to define the motor support portion according to a preferred embodiment of the present invention through insert molding.

FIG. 8 is a cross-sectional view illustrating the structures of an upper mold 110 and a lower mold 120 arranged to define the motor support portion 40 through insert molding. The upper mold 110 includes a truncated conical portion 111 arranged to define an inner circumferential surface of the bearing support portion 42, and a truncated conical portion 112 arranged to define an outer circumferential surface of the bearing support portion 42 and an inner circumferential surface of the stator support portion 43. Meanwhile, the lower mold 120 includes a truncated conical portion 121 arranged to define the inner circumferential surface of the bearing support portion 42, a hollow cylindrical portion 122 arranged to define an outer circumferential surface of the stator support portion 43, and a gate 123 through which a molten material is injected. The molten material is preferably a resin material, but any other desirable moldable material could be used.

Figure 9:
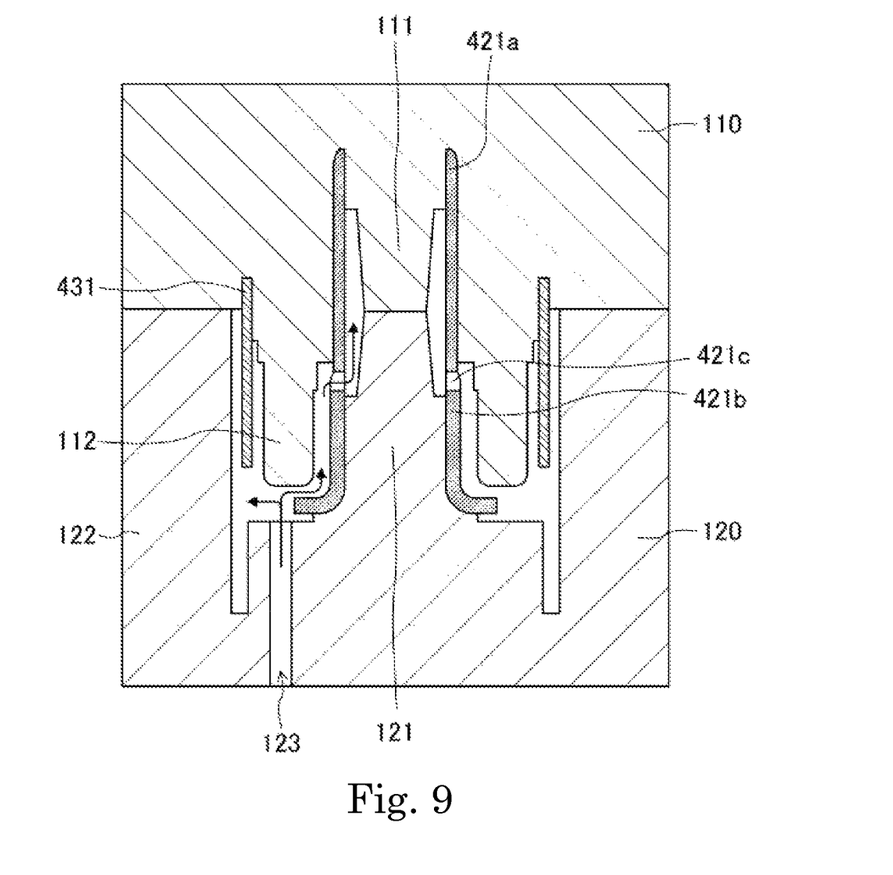
FIG. 9 is a cross-sectional view illustrating the structure of molds by which the motor supporting portion according to a preferred embodiment of the present invention is formed through insert molding method.

Referring to FIGS. 8 and 9, the metallic member 431 is arranged on an outer circumferential surface of the portion 112 of the upper mold 110, and the metallic members 421a and 421b are arranged on an outer circumferential surface of the portion 111 of the upper mold 110, and then the lower mold 120 is fitted to the upper mold 110 in the axial direction. As a result, spaces corresponding to the base portion 41, the resin layers 422a and 422b of the bearing support portion 42, and the resin layers 432a and 432b of the stator support portion 43 are defined between the two molds 110 and 120.

Thereafter, the molten resin material is injected through the gate 123 of the lower mold 120, so that the molten resin material flows to the space corresponding to the stator support portion 43 through the space corresponding to the base portion 41, and to the space corresponding to the bearing support portion 42 through the space corresponding to the base portion 41 and the communicating holes 421c, as indicated by arrows in FIG. 9. After the molten resin is solidified, the two molds 110 and 120 are separated from each other, and the motor support portion 40 defined through the insert molding is taken out of the molds 110 and 120 by using an ejector pin (not shown) provided in the upper mold 110.

Note that molds usable to define the motor support portion 40 according to the present preferred embodiment through the insert molding are not limited to the molds having the structures illustrated in FIG. 8, but that all manner of molds having a variety of structures are also usable for that purpose. Also note that, when the stationary vanes 70 and/or the housing 80 are molded integrally with the motor support portion 40, portions corresponding to the stationary vanes 70 and/or the housing 80 may be added to the two molds 110 and 120 illustrated in FIG. 8.

Figure 10:
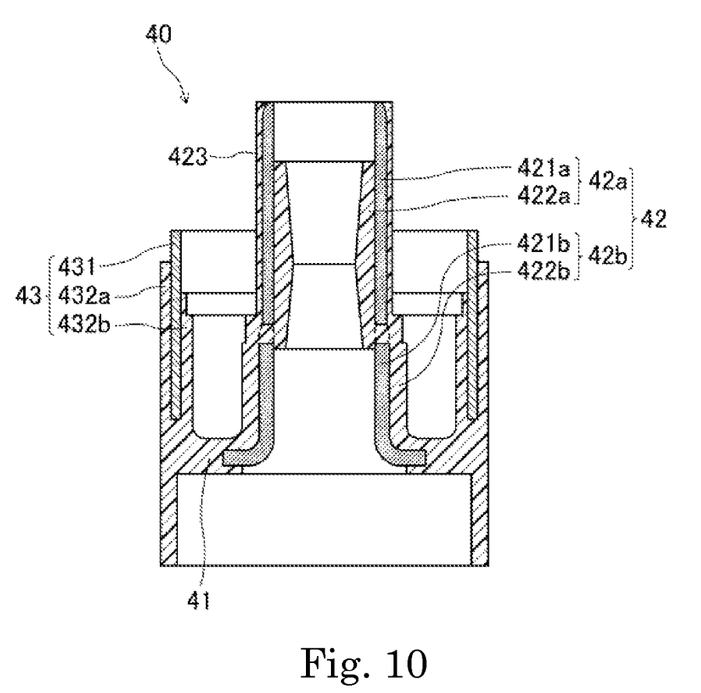
FIG. 10 is a schematic cross-sectional view illustrating a bearing support portion according to an example modification of a preferred embodiment of the present invention.

For example, in FIG. 8, the inner circumferential surface and the outer circumferential surface of the metallic member 421a, which is to be provided in the bearing support portion 42, are arranged in contact with the outer circumferential surface of the portion 111 of the upper mold 110 and an inner circumferential surface of a portion 113 of the upper mold 110, respectively, and held thereby. Note, however, that only the inner circumferential surface of the metallic member 421a may be arranged in contact with the outer circumferential surface of the portion 111 of the upper mold 110 and held thereby. In this case, a gap is defined between the outer circumferential surface of the metallic member 421a and the portion 113 of the upper mold 110, and this contributes to decreasing the frequency with which the upper mold 110 and the metallic member 421a are rubbed against each other during the insert molding, leading to an extended life of the mold. In addition, an improvement in tolerance in dimensional control of the mold is achieved. In this case, referring to FIG. 10, the motor support portion 40 defined as a result of the insert molding additionally includes a resin layer 423 arranged on the outer circumferential surface of the metallic member 421a. Although the provision of the resin layer 423 on the outer circumferential surface of the metallic member 421a results in an increased outside diameter of the bearing support portion 42a, the blower fan having the above-described structure affords to have an extra radial dimension to secure a gap between the resin layer 423 and the rotor holder 11.

Next, the stator 30 is inserted from above in the axial direction into the stator support portion 43 to be fixed to the stator support portion 43. Here, the stator 30 may either be simply press-fitted to the stator support portion 43 with application of a slight force, or may be additionally adhered to the stator support portion 43. Thereafter, the first circuit board 91 is fixed to the bearing support portion 42, and the stator 30 is subjected to a winding process.

Next, the pair of the bearings 60 are inserted into the bearing support portion 42 one from above and the other from below in the axial direction, and thereafter an assembly including a unified combination of the rotor 10 (i.e., the rotor holder 11 and the rotor magnet 12), the impeller (i.e., the impeller cup 51, the blades 52, and the annular metallic member 53), and the shaft 20 is inserted into the bearings 60. Here, the rotor holder 11 and the annular metallic member 53 may be coupled to the impeller cup 51 through insert molding.

Finally, the upper bearing 60 is fixed through a ring (not shown), and the lower bearing 60 is fixed through a coil spring and a washer 93, and thereafter the second circuit board 92 is fixed to the base portion 41.

Note that the order of the steps and the method of assembling the components of the blower fan 100 described above with reference to the above-described manufacturing method may be modified appropriately in manufacturing the blower fan 100.

While preferred embodiments of the present invention have been described above, the foregoing description should not be construed as restrictive of the present invention, but it is to be understood that a variety of modifications are possible. For example, although the axial fan according to a preferred embodiment of the present invention has been described above for illustration, it is to be understood that the present invention is also applicable to centrifugal fans. Moreover, although ball bearings are preferably used as the bearings 60 in the above-described preferred embodiment, it is to be understood that an oil-impregnated bearing defined by a sleeve may be used in other preferred embodiments of the present invention. Furthermore, although the stationary vanes 70 are provided radially outward of the resin layer 432a in the above-described preferred embodiment, it is to be understood that ribs arranged to join the motor support portion 40 and the housing 80 to each other may be provided in place of the stationary vanes 70 in other preferred embodiments of the present invention.

It is to be understood that additional variations and modifications of the present invention will be apparent to those skilled in the art without departing from the scope and spirit of the present invention. The scope of the present invention, therefore, is to be determined solely by the following claims.

What is claimed is:

1. A blower fan comprising:
   a rotor arranged to rotate about a rotation axis together with a shaft;
   a stator arranged radially outward of the rotor and opposite to the rotor;
   a motor support portion arranged to support the shaft through a bearing such that the shaft is rotatable with respect to the stator;
   an impeller arranged to rotate together with the shaft; and
   a plurality of stationary vanes integrally defined with the motor support portion; wherein
   the motor support portion includes a base portion, a bearing support portion arranged to support the bearing, and a stator support portion arranged to support the stator;
   each of at least a portion of the bearing support portion which is in contact with the bearing and at least a portion of the stator support portion which is in contact with the stator is defined by a metallic member coupled to the base portion by being at least partially embedded within a resin material defining a portion of the base portion;
   the stator support portion includes a resin layer arranged radially outside the metallic member in the stator support portion; and
   the plurality of stationary vanes are arranged radially outside the resin layer, the plurality of vanes including at least a portion which overlaps with the metallic member in a radial direction.

2. The blower fan according to claim 1, wherein the metallic member in the stator support portion is exposed at least at a portion of a radially outer surface of the stator support portion.

3. The blower fan according to claim 1, wherein
   the stator support portion includes a resin layer defined in a radially inner portion thereof; and
   an axial lower end portion of the stator is arranged in contact with an upper end portion of the resin layer.

4. The blower fan according to claim 1, wherein at least one of the entire stator support portion and the entire bearing support portion is made of a metal.

5. The blower fan according to claim 1, wherein the metallic member in the stator support portion and the metallic member in the bearing support portion are defined by separate and distinct members.

6. The blower fan according to claim 1, wherein
the rotor includes a substantially cylindrical rotor holder, and a rotor magnet fixed to an outer circumferential surface of the rotor holder;
the impeller includes a substantially cylindrical impeller cup fixed to the shaft, and a plurality of blades arranged on an outer circumferential surface of the impeller cup;
the impeller cup is provided with an annular metallic member arranged in a lower opening end portion thereof; and
each of the rotor holder and the annular metallic member is coupled to the impeller cup by being at least partially embedded within the impeller cup.

7. The blower fan according to claim 1, wherein
the impeller includes a substantially cylindrical impeller cup fixed to the shaft, and a plurality of blades arranged on an outer circumferential surface of the impeller cup; and
the blades of the impeller are arranged radially outward of the stator.

8. The blower fan according to claim 1, further comprising:
a first circuit board supported by either the stator support portion or a lower portion of the bearing support portion; and
a second circuit board supported by the base portion.

9. The blower fan according to claim 1, wherein an end portion of the metallic member in the bearing support portion is arranged to extend into the base portion and be exposed below a lower end portion of the base portion.

10. A method of manufacturing a blower fan including:
a rotor arranged to rotate about a rotation axis together with a shaft;
a stator arranged radially outward of the rotor and opposite to the rotor;
a motor support portion arranged to support the shaft through a bearing such that the shaft is rotatable;
an impeller arranged to rotate together with the shaft; and
a plurality of stationary vanes integrally defined with the motor support portion, the method comprising the steps of:
molding the motor support portion as a single monolithic piece, the motor support portion including a base portion, a bearing support portion arranged to support the bearing, and a stator support portion arranged to support the stator;
fixing the stator to the stator support portion;
arranging the bearing on the bearing support portion; and
fixing the rotor and the impeller to the shaft, and thereafter inserting the shaft into the bearing; wherein
metallic members are arranged in at least a portion of the bearing support portion which is to be in contact with the bearing and at least a portion of the stator support portion which is to be in contact with the stator, and coupled to the base portion through insert molding;
the stator support portion includes a resin layer arranged radially outside the metallic members in the stator support portion; and
the plurality of stationary vanes are arranged radially outside the resin layer, the plurality of vanes including at least a portion which overlaps with at least one of the metallic members in a radial direction.

11. The method according to claim 10, wherein
the rotor includes a substantially cylindrical rotor holder, and a rotor magnet fixed to an outer circumferential surface of the rotor holder;
the impeller includes a substantially cylindrical impeller cup fixed to the shaft, and a plurality of blades arranged on an outer circumferential surface of the impeller cup; and
the rotor holder is coupled to the impeller cup through insert molding.

* * * * *